(12) United States Patent
Adapala et al.

(10) Patent No.: US 11,568,388 B1
(45) Date of Patent: Jan. 31, 2023

(54) SYSTEMS AND METHODS FOR TRANSFERRING FIAT CURRENCY VIA MAPPED MATH-BASED CURRENCY ACCOUNTS

(71) Applicant: Wells Fargo Bank, N.A., San Francisco, CA (US)

(72) Inventors: Naga Adapala, Pleasanton, CA (US); Kevin D. Bouey, San Anselmo, CA (US); Judd Holroyde, Mill Valley, CA (US); Aravind Krishnasamy, San Ramon, CA (US); Bipin M. Sahni, Pleasanton, CA (US); Nishant Usapkar, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 493 days.

(21) Appl. No.: 15/272,117

(22) Filed: Sep. 21, 2016

(51) Int. Cl.
*G06Q 20/36* (2012.01)

(52) U.S. Cl.
CPC .................. *G06Q 20/36* (2013.01)

(58) Field of Classification Search
CPC ...................................................... G06Q 20/36
USPC ........................................................... 705/39
See application file for complete search history.

(56) References Cited

U.S. PATENT DOCUMENTS

| 10,269,009 | B1 | 4/2019 | Winklevoss | |
|---|---|---|---|---|
| 2010/0280948 | A1 | 11/2010 | Cohen | |
| 2014/0351072 | A1* | 11/2014 | Wieler | G06Q 20/405 705/21 |
| 2015/0332256 | A1 | 11/2015 | Minor | |
| 2015/0365283 | A1 | 12/2015 | Ronca et al. | |

(Continued)

FOREIGN PATENT DOCUMENTS

| IN | 20150023713 A | 7/2016 |
|---|---|---|
| WO | WO-2016/204461 | 12/2016 |

OTHER PUBLICATIONS

Tschorsch Florian, Scheuermann Bjorn, "Bitcoin and Beyond: A Technical Survey on Decentralized Digital Currencies", Aug. 19, 2016, IEEE Communications Surveys and Tutorials vol. 18 No. 3 (Year: 2016).*

W.-T. Tsai, R. Blower, Y. Zhu and L. Yu, "A System View of Financial Blockchains," Mar. 29, 2016 IEEE Symposium on Service-Oriented System Engineering (SOSE), 2016, pp. 450-457, doi: 10.1109/SOSE.2016.66. (Year: 2016).*

(Continued)

*Primary Examiner* — Daniel S Felten
*Assistant Examiner* — Kevin T Poe
(74) *Attorney, Agent, or Firm* — Foley & Lardner LLP

(57) ABSTRACT

A method, system, and apparatus for performing a transaction for a customer having a fiat account with a financial institution. The method includes receiving a transaction request from the customer, the transaction request including a request to transfer a first amount of fiat currency to a receiving account held at a partner financial institution; determining a second amount of math-based currency ("MBC") corresponding to the first amount of fiat currency, wherein the MBC is held in an MBC wallet account; transmitting the second amount of MBC to a partner financial institution computing system of the partner financial institution via a permissioned blockchain system; updating the MBC wallet account to reflect the transaction; debiting a fiat account balance associated with the fiat account of the customer by the first amount; and transferring fiat currency between the financial institution and the partner financial institution to settle a plurality of transactions.

7 Claims, 5 Drawing Sheets

(56) References Cited

U.S. PATENT DOCUMENTS

| | | | |
|---|---|---|---|
| 2015/0371224 A1 | 12/2015 | Lingappa | |
| 2016/0203496 A1 | 7/2016 | Guerrero et al. | |
| 2016/0267471 A1* | 9/2016 | Gramenov | G06Q 20/02 |
| 2016/0292680 A1 | 10/2016 | Wilson et al. | |
| 2016/0330027 A1 | 11/2016 | Ebrahimi | |
| 2016/0342976 A1* | 11/2016 | Davis | H04L 9/50 |
| 2016/0342978 A1* | 11/2016 | Davis | G06Q 20/38215 |
| 2016/0342994 A1* | 11/2016 | Davis | G06Q 20/4014 |
| 2017/0140371 A1* | 5/2017 | Forzley | G06Q 20/065 |
| 2017/0230375 A1* | 8/2017 | Kurian | H04L 63/102 |
| 2017/0300898 A1* | 10/2017 | Campero | G06Q 20/3676 |
| 2017/0331896 A1* | 11/2017 | Holloway | H04L 67/12 |
| 2017/0372278 A1* | 12/2017 | Frolov | G06Q 20/0655 |
| 2018/0060927 A1* | 3/2018 | Gupta | G06Q 30/0601 |

OTHER PUBLICATIONS

X. Dai, K. Chaudhary and J. Grundy, "Comparing and Contrasting Micro-payment Models for Content Sharing in P2P Networks," Dec. 18, 2007, Third International IEEE Conference on Signal-Image Technologies and Internet-Based System, 2007, pp. 347-354, doi: 10.1109/SITIS.2007.63. (Year: 2007).*

Nakamoto, Satoshi, "Bitcoin: A Peer-to-Peer Electronic Cash System", www.bitcoin.org, 2008. 9 pages.

Peters et al., "Understanding Modern Banking Ledgers through Blockchain Technologies: Future of Transaction Processing and Smart Contracts on the Internet of Money", Nov. 19, 2015. 33 pages.

Swanson, Tim, "Consensus-as-a-service: a brief report on the emergence of permissioned, distributed ledger systems", Apr. 6, 2015. 66 pages.

Wood, Gavin Dr., "Ethereum: A Secure Decentralised Generalised Transaction Ledger", Homestead Draft, 2014. 32 pages.

* cited by examiner

SYSTEMS AND METHODS FOR TRANSFERRING FIAT CURRENCY VIA MAPPED MATH-BASED CURRENCY ACCOUNTS

TECHNICAL FIELD

Embodiments of the present disclosure relate generally to the field of processing financial transactions.

BACKGROUND

Financial transactions between two or more financial institutions ("FIs") conventionally involve the use of clearing and settlement systems, such as the Automated Clearing House ("ACH"). Using such systems to complete transactions between FIs can take a period of time to process. In some instances, that time period lasts multiple days while the transaction is being processed and verified. Many times, customers desire to transfer money to other customers banking at different FIs more quickly. Furthermore, even when using math-based currency ("MBC"), FIs typically require customers to maintain a separate MBC account and manage the complexities of MBC systems to complete transfers in a more efficient manner.

SUMMARY

A first example embodiment relates to a method for performing a transaction for a customer having a fiat account with an FI. The method includes receiving a transaction request from the customer via a customer computing device. The transaction request includes a request to transfer a first amount of fiat currency to a receiving account. The receiving account is held at a partner FI. The method also includes determining a second amount of MBC corresponding to the first amount of fiat currency. The method further includes holding MBC in an MBC wallet account. The second amount of MBC is transmitted to a partner FI computing system of the partner FI via a permissioned blockchain system. Each of the FI and the partner FI have access to the permissioned blockchain system. The MBC wallet account is updated to reflect the transaction. The MBC wallet account includes information relating to an account balance of a customer MBC account, and the customer MBC account is mapped to the fiat account of the customer. A transaction confirmation is received from the partner FI computing system. A fiat account balance associated with the fiat account of the customer is debited by the first amount. Fiat currency is transferred between the FI and the partner FI to settle a plurality of transactions.

Another example embodiment relates to a transaction processing system of an FI for opening and mapping MBC accounts to fiat currency accounts. The system includes a network interface configured to facilitate data transmission over a network, a fiat currency account of a customer of the FI, an MBC account of the customer and an account mapping circuit. The MBC account is mapped to the fiat currency account. The account mapping circuit is configured to receive an indication of a transaction request from a customer of the FI. The account mapping circuit also determines that the MBC account for the customer does not exist and creates the MBC account of the customer for processing the transaction request. The account mapping circuit further maps the MBC account of the customer to the fiat currency account of the customer.

A further example embodiment relates to an apparatus. The apparatus includes one or more customer fiat accounts, one or more customer MBC accounts, a transaction circuit, an MBC account setup circuit, a permissioned blockchain system, and a settlement circuit. The transaction circuit is structured to receive a transaction request from the customer via a customer computing device. The transaction request includes a request to transfer a first amount of fiat currency to a receiving account. The receiving account is held at a partner FI. The transaction circuit is further structured to debit a fiat account balance associated with the one or more customer fiat accounts by the first amount of fiat currency and determines a second amount of MBC corresponding to the first amount of fiat currency. The MBC is held in an MBC wallet account. The MBC account setup circuit is structured to create the one or more customer MBC accounts upon receiving the transaction request to transfer the first amount of fiat currency to the receiving account. The permissioned blockchain system is structured to transmit the second amount of MBC to a partner FI computing system of the partner FI. Each of the FI and the partner FI have access to the permissioned blockchain system. The settlement circuit is structured to transfer fiat currency between the FI and the partner FI to settle a plurality of transactions.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the figures, systems and methods for transferring fiat currency via mapped MBC accounts are shown. According to various example embodiments, a transaction processing system allows customers of the FI to conduct fiat currency transactions (e.g., transfer fiat currency) using MBC as a proxy for transactions occurring between FIs. A blockchain system is set up between the FIs that allows for transfers between the FIs using MBC. The MBC acts as a placeholder for the fiat currency while the transaction is processing between different FIs. Thus, the MBC that is being transferred does not itself have any intrinsic value.

The blockchain based transaction processing system solves technical problems associated with conventional transaction processing systems. Conventionally, transactions involving transferring fiat currency, particularly between accounts managed by different FIs, can take a period of time to process. In some instances, that time period lasts multiple days while the transaction is being processed and verified. The present system enables FIs to transfer fiat currency between customers at each institution in a more timely manner using blockchain technology. MBC transactions are less prone to fraudulent activity than conventional fiat currency transfers of due to use of advanced cryptography. As such, the same processing time period is not necessary for MBC transactions. The secure nature of MBC transactions allows FIs to transfer currency in a more secure and more efficient way. According to various example embodiments, a blockchain system utilizes MBC as a proxy for interbank transactions without requiring customers to have a separate MBC account. By utilizing MBC to facilitate interbank transactions, FIs may facilitate fiat currency transactions with other FIs on a near real-time basis, thereby improving the speed and efficiency of interbank fiat currency transfers. In addition, utilizing MBC as a proxy for fiat currency transfers provides a robust record of every transaction that has taken place. Further, embodiments solve technical problems relating to the complexity required for customers to perform MBC transactions. Instead of requiring customers to navigate complex MBC systems (e.g., managing MBC wallets, public and private keys, etc.), embodiments utilize a backend system to seamlessly facilitate MBC transactions without requiring customer interactions. Accordingly, embodiments leverage the benefits of MBC (e.g., high transaction speed, low transaction cost, high security, etc.) without requiring customers to manage complex MBC systems. Still further, embodiments allow FIs to perform inter-bank transfers without requiring the use of conventional clearing and settlement systems, such as the ACH. Therefore, various embodiments require less computing power and network resources to perform inter-bank transfers, while reducing the amount of time needed for such transfers.

Figure 1:
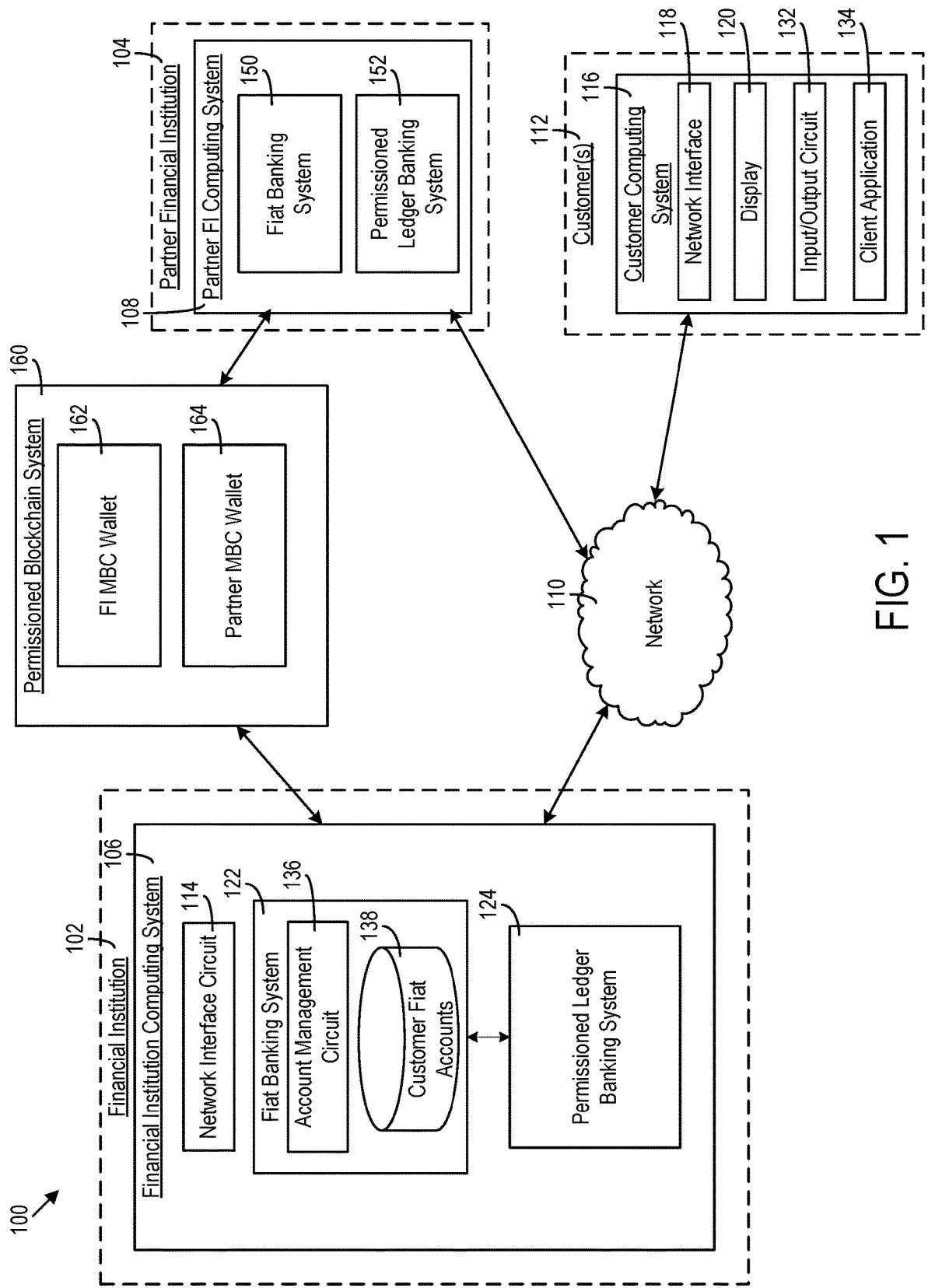
FIG. 1 is a schematic diagram of a transaction processing system for MBC, according to an example embodiment.

Referring to FIG. 1, a schematic diagram of a transaction processing system 100 is shown, according to an example embodiment. As described in further detail below, the system 100 may facilitate the transfer of fiat currency between an FI 102 and a partner FI 104 using a permissioned blockchain system 160. As shown, the system 100 includes an FI computing system 106 communicably and operatively coupled to each of a partner FI computing system 108, a permissioned blockchain system 160, and a customer computing system 116 associated with a customer 112, over a network 110. The network 110 may provide communicable and operative coupling between the customer computing system 116, FI computing system 106, partner FI computing system 108, the permissioned blockchain system 160, and the other components disclosed and described herein to provide and facilitate the exchange of communications (e.g., data, instructions, values, commands, etc.). Accordingly, the network 110 may include any network including wired (e.g., Ethernet) and/or wireless networks (e.g., 802.11X, ZigBee, Bluetooth, Internet, WiFi). In some embodiments, the network 110 may further include a proprietary banking network to provide secure or substantially secure communications.

The FI 102 offers banking services to customers 112. The FI 102 offers traditional fiat currency banking services through a fiat banking system 122 within the FI computing system 106. Fiat currency is money that is declared by a government to be legal tender (e.g., US Dollars, Canadian Dollars, Chinese Yuan, Euros, Japanese Yen, etc.). The fiat banking services may include demand deposit accounts, credit services, loan services, investment services, and the like. The FI 102 may also offer MBC services through a permissioned ledger banking system 124 within the FI computing system 106. In addition or instead of offering MBC services through the permissioned ledger banking system 124, the FI 102 may offer MBC services through a permissionless ledger banking system. Additionally as shown in FIG. 1, the FI 102 may hold a wallet account, referred to as an FI MBC wallet 162, with the permissioned blockchain system 160.

The partner FI 104 may be an FI which is an authorized member of the permissioned blockchain system 160. Accordingly, like the FI 102, the partner FI 104 may hold a wallet account, referred to as a partner MBC wallet 164, with the permissioned blockchain system 160. The permissioned blockchain system 160, described further herein, may comprise a distributed permission-based blockchain system, where member FIs are authorized to participate. Other embodiments include a permissionless blockchain system in addition to, or instead of, the permission-based blockchain system. For example, for a permissionless blockchain system, an entity does not have to be recognized as having a previous relationship with the system (e.g., public blockchain systems, Bitcoin, etc.), whereas for a permission-based blockchain system, the entity must be recognized as having a previous relationship with the system (e.g., private blockchain systems, private FI systems). For example, in a permission-based blockchain system, an entity desiring to take part in the system must first be recognized and authorized to partake in the system. In some arrangements, the partner FI 104 may not yet be an authorized member of the permissioned blockchain system 160 and may need to be authorized to proceed engaging with other FIs through the system 100. Similar to the FI 102, the partner FI 104 may offer traditional fiat currency banking services through a fiat banking system 150. Additionally, the partner FI 104 may also offer MBC services through a permissioned ledger banking system 152 within the partner FI computing system 108.

As shown in FIG. 1, the permissioned blockchain system 160 may include an FI MBC wallet 162 and a partner MBC wallet 164. The FI MBC wallet 162 is managed by the FI 102 and similarly, the partner MBC wallet 164 is managed by the partner FI 104. Transactions occurring between the FI 102 and the partner FI 104 may be processed via the permissioned blockchain system 160. As such, the permissioned blockchain system 160 may be communicably and operatively coupled to both the FI computing system 106 and the partner FI computing system 108 such that access to the respective wallets (e.g., FI MBC wallet 162, partner MBC wallet 164, etc.) is available. As noted above, the permissioned blockchain system 160 may comprise a distributed permission-based blockchain system, where member FIs are authorized to participate. Other embodiments include a permissionless blockchain system in addition to, or instead of, the permission-based blockchain system.

In one embodiment, the FIs may utilize separate routing numbers for MBC transfers and fiat currency transfers. As such, MBC transfers between the FI 102 and the partner FI 104 may occur through an MBC designated routing number. Furthermore, selection of the routing number can be done manually or automatically. For example, a customer 112 can manually select a particular routing number for a person-to-person transfer or the transaction processing system 100 can automatically select the appropriate routing number for the transaction.

The customer computing system 116 may include any type of computing system that may be used to interface with the FI computing system 106. The customer computing system 116 may include any type of computing system including, but not limited to, a phone (e.g., smartphone, etc.)

and a computing device (e.g., tablet computer, laptop computer, desktop computer, personal digital assistant, etc.).

The customer 112 may be any person or entity using the customer computing system 116. In some arrangements, customers 112 are account holders with the FI 102. Customers 112 may use the FI 102 for fiat banking services. For example, a customer 112 may have a fiat currency deposit account, such as a savings account or a checking account in US Dollars. Additionally or alternatively, customers 112 may have MBC accounts with the FI 102.

The FI computing system 106 may be associated with or operated by the FI 102 (e.g., a bank, a credit card issuer, etc.). The FI computing system 106 may be communicably and operatively coupled to the customer computing system 116 to facilitate interaction between customers 112 and the FI 102. Additionally, the FI computing system 106 is communicably and operatively coupled to the permissioned blockchain system 160 to facilitate near real-time transfers of fiat currency between the FI 102 and the partner FI computing system 108.

Similarly, the partner FI computing system 108 may be associated with or operated by the partner FI 104 (e.g., a bank, a credit card issuer, etc.). The partner FI computing system 108 may be communicably and operatively coupled to the permissioned blockchain system 160 to facilitate interaction between the partner FI 104 and the FI 102 via the network 110. As mentioned above, both the FI 102 and the partner FI 104 (and any other authorized member FIs) maintain wallet accounts (e.g., FI MBC wallet 162, partner MBC wallet 164, etc.) with the permissioned blockchain system 160.

The following is an example interaction between the customer 112, FI 102, and partner FI 104. The system 100 allows the customer 112 of the FI 102 to submit a transaction request to the FI 102 (received and processed by the FI computing system 106). For example, the transaction request is for a transfer of fiat currency to a customer of the partner FI 104. In this example, the amount of fiat currency requested for transfer is debited from the customer fiat account with the FI 102. Next, the FI 102 transfers digital currency (MBC) to the FI MBC wallet 162 held with the permissioned blockchain system 160. Using the permissioned blockchain system 160, a message is sent to the partner MBC wallet 164 indicating the transfer is occurring and information associated with that transfer (e.g., amount of transfer, origin of transfer, recipient account number, etc.). In one embodiment, the message including information associated with the transfer may be included in the metadata of the MBC currency (e.g., colored coins). As such, no additional information needs to be transferred in the message. In another embodiment, a separate message including such information can be transferred along with the message indicating the transfer is occurring. In some embodiments, the transfer between the two FIs occurs exclusively within the permissioned blockchain system 160 and acts as a promise-to-pay between the FIs. In other embodiments, the transfer between the two FIs includes activity outside the permissioned blockchain system 160 to complete the transfer. When the partner MBC wallet 164 receives the transfer message, the permissioned blockchain system 160 then transfers digital currency (MBC) to the partner FI 104, which then credits the partner FI customer's fiat account using fiat currency.

In addition to the FI 102 and partner FI 104 holding wallet accounts with the permissioned blockchain system 160, the system 100 utilizes account mapping to perform the transaction process. As described further herein with regard to FIGS. 2-4, when the FI computing system 106 receives a transaction request from the customer 112, the FI computing system 106 sets up an MBC account that is then mapped to the customer's fiat account. When used herein, "account mapping" refers to the linkage between a customer fiat account and an MBC account used for the transaction processing. Account mapping occurs when any transactions between FIs are processed via the permissioned blockchain system 160. Account mapping serves to update the customer fiat accounts once a transaction is processed using the permissioned blockchain system 160.

The FI computing system 106 includes a network interface circuit 114, a fiat banking system 122, and a permissioned ledger banking system 124. In practice, the FI computing system 106 may include server computing systems, for example, comprising one or more networked computer servers having a processor and non-transitory machine readable media.

The network interface 114 may be used to establish connections with other components of the system 100 by way of network 110. The network interface 114 may include program logic that facilitates connection of the FI computing system 106 to the network 110. The network interface 114 may support communication between the FI computing system 106 and other systems, such as the customer computing system 116 and the partner FI computing system 108. For example, the network interface 114 may include a cellular modem, a Bluetooth transceiver, a Bluetooth beacon, a radio-frequency identification (RFID) transceiver, and a near field communication (NFC) transmitter. In some arrangements, the network interface 114 may include the hardware and machine-readable media sufficient to support communication over multiple channels of data communication. Further, the network interface 114 may include cryptography capabilities to establish a secure or relatively secure communication session between the FI computing system 106, customer computing system 116, and partner FI computing system 108. In this regard, financial data (or other types of data) may be encrypted and transmitted to prevent or substantially prevent the threat of hacking.

The fiat banking system 122 includes an account management circuit 136 and a customer fiat accounts database 138.

Figure 3:
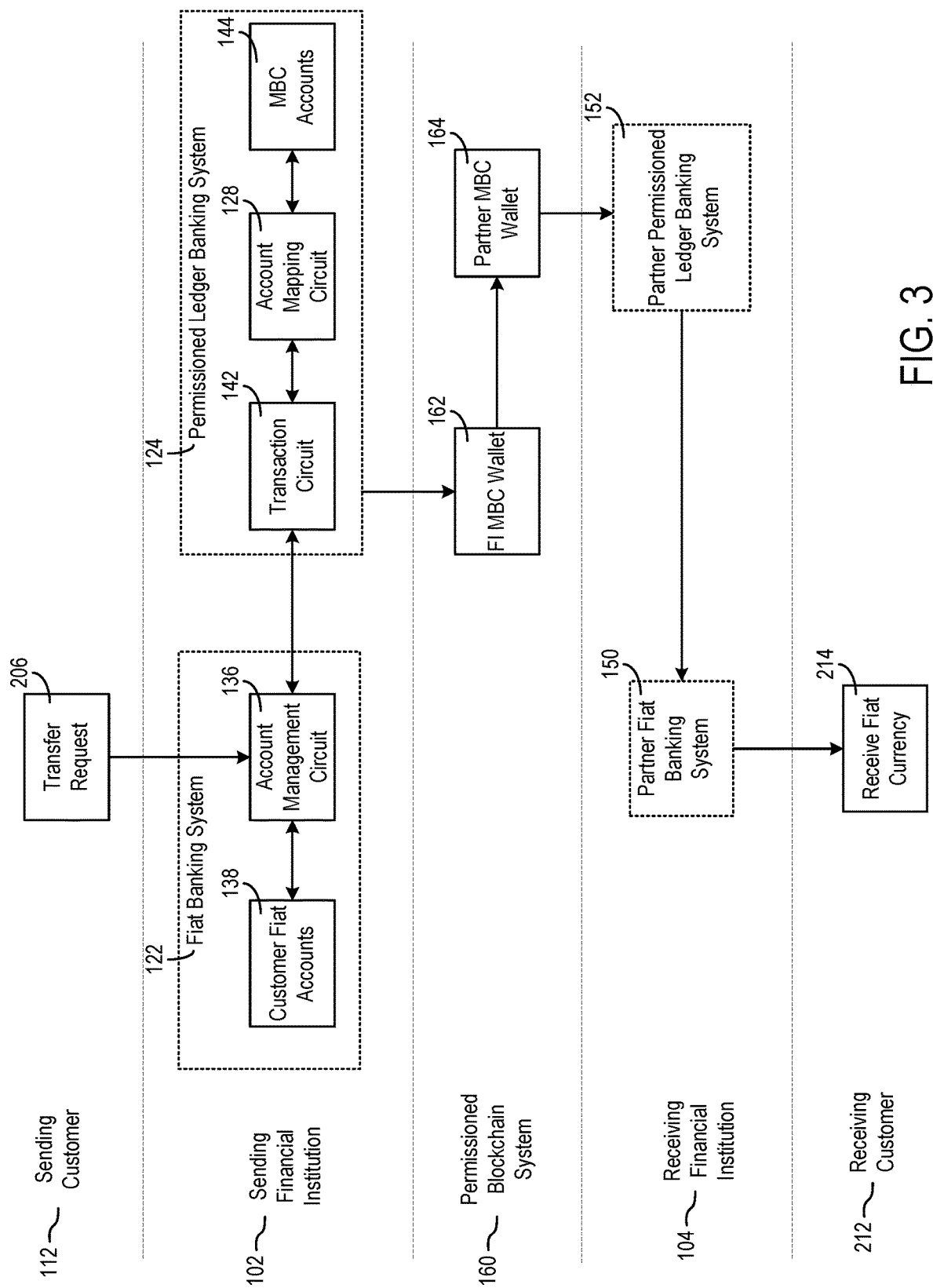
FIG. 3 is a flow diagram of interactions between a sending FI and a receiving FI, according to an example embodiment.

The account management circuit 136 may be structured to receive transaction requests from customers 112 via the customer computing system 116. As shown in FIG. 3, transaction requests may include a transfer request between the customer fiat account at the FI 102 and a customer fiat account at a partner FI 104. Information regarding the customer fiat account may be stored in the customer fiat accounts database 138.

The customer fiat accounts database 138 may be structured to selectively provide access to information relating to the fiat accounts of the customer 112. In this regard, the customer fiat accounts database 138 may be communicably and operatively coupled to the FI computing system 106 to provide access to such information, such that the FI computing system 106 may facilitate transactions between the FI 102 and the partner FI 104 over the network 110.

The partner FI computing system 108 may include the same, or similar, components as the FI computing system 106 so as to facilitate transactions between the partner FI computing system 108 and the FI computing system 106 over the network 110. As such, the partner FI computing system 108 includes a fiat banking system 150 and a permissioned ledger banking system 152. In some embodiments, the FI 102 may hold a reserve account with the partner FI 104 such that near real-time transactions may occur between the customers 112 of the FI 102 and customers of the partner FI 104.

As shown, the customer computing system 116 includes a network interface 118, a display 120, an input/output circuit 132, and a client application 134.

The network interface 118 of the customer computing system 116 may be adapted for and configured to establish a communication session via the network 110 with the FI computing system 106. Accordingly, the network interface 118 may include any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver).

The display 120 may be used to present account information, transaction information, and the like to customers 112. In this regard, the display 120 may be communicably and operatively coupled to the input/output circuit 132 to provide a user interface for receiving and displaying information on the customer computing system 116.

The input/output circuit 132 may be structured to receive and provide communication(s) to the customer 112. In this regard, the input/output circuit 132 may be structured to exchange data, communications, instructions, etc. with an input/output component of the customer computing system 116. Accordingly, in one embodiment, the input/output circuit 132 may include an input/output device such as a display device, a touchscreen, a keyboard, and a microphone. In another embodiment, the input/output circuit 132 may include communication circuitry for facilitating the exchange of data, values, messages, and the like between an input/output device and the components of the customer computing system 116. In yet another embodiment, the input/output circuit 132 may include machine-readable media for facilitating the exchange of information between the input/output device and the components of the customer computing system 116. In still another embodiment, the input/output circuit 132 may include any combination of hardware components (e.g., a touchscreen), communication circuitry, and machine-readable media.

The client application 134 may comprise program logic (i.e., stored executable instructions) configured to implement at least some of the functions described herein. The client application 134 may simply be a web browser (e.g., Internet Explorer®, Chrome®, Safari®, etc.) configured to receive and display web pages received from the FI computing system 106. In other arrangements, the client application 134 may include a dedicated application (e.g., a smartphone application), a text message interface, or another program suitable for communicating with the FI computing system 106 over the network 110.

Figure 2:
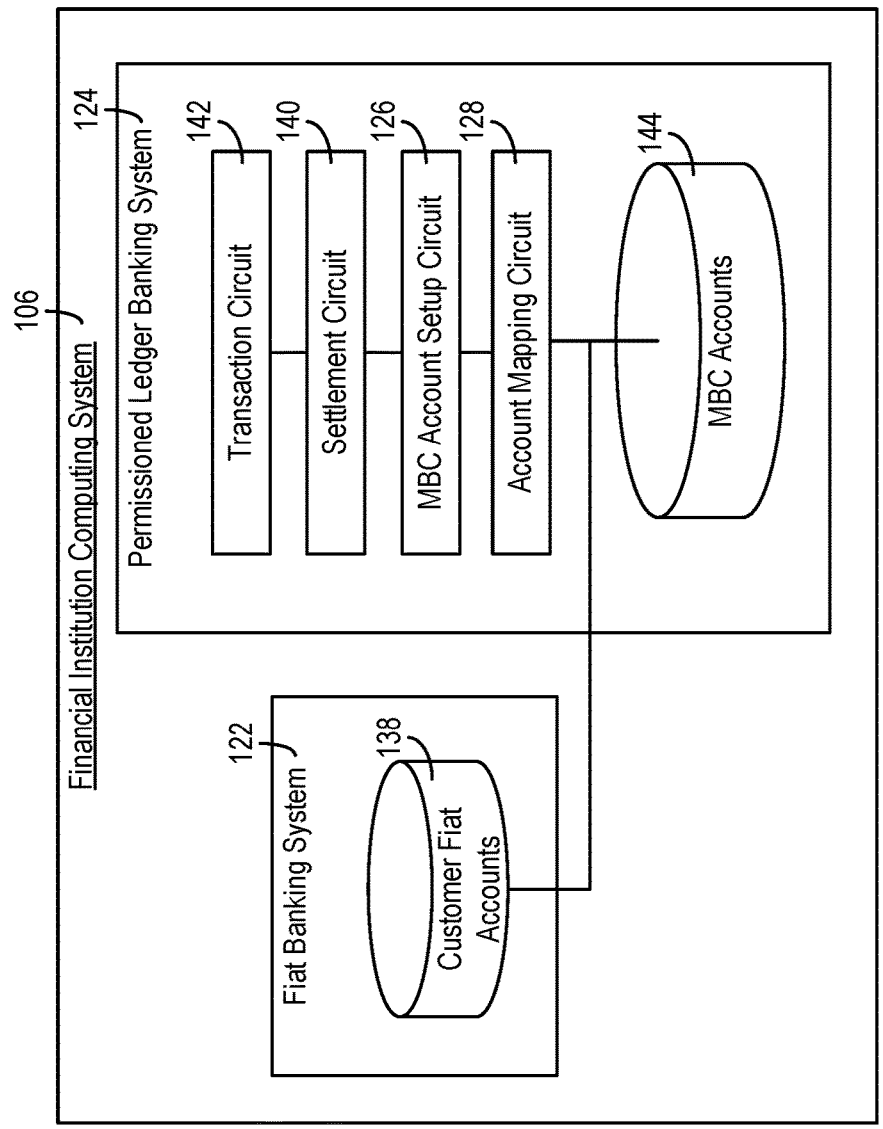
FIG. 2 is a schematic diagram of the transaction processing system of FIG. 1, according to an example embodiment.

Referring now to FIG. 2, the permissioned ledger banking system 124 is shown, according to an example embodiment. The permissioned ledger banking system 124 includes a transaction circuit 142, settlement circuit 140, MBC account setup circuit 126, account mapping circuit 128, and MBC accounts database 144.

The transaction circuit 142 may be structured to receive a transaction request from the account management circuit 136 and communicate the customer transaction request to the permissioned blockchain system 160. The transaction request may define the amount of fiat currency that is desired to be transferred in the transaction request. The transaction circuit 142 may transfer the appropriate amount of MBC via the permissioned blockchain system 160 between the FIs.

The transaction circuit 142 may additionally be structured to receive a transaction confirmation via the permissioned blockchain system 160 after the transaction is processed. In this regard, the transaction circuit 142 may be communicably and operatively coupled to the permissioned blockchain system 160 to transfer the appropriate fiat amount between the FIs. In doing this, the transaction circuit 142 may designate the amount of MBC relating to the amount of fiat currency to be transferred between the FIs during the transaction process. In some embodiments, one unit of MBC (e.g., one MBC coin) is equivalent to one unit of fiat currency (e.g., one U.S. dollar). In other embodiments, one unit of MBC is equivalent to another amount of fiat currency. It should be understood that, according to various embodiments, MBC is used as a proxy for fiat currency, and does not have any intrinsic value. For example, the MBC used according to various embodiments may be used for accounting purposes for inter-bank transfers and may not be traded on an open exchange.

The settlement circuit 140 may be structured to transfer fiat currency between the FI 102 and the partner FI 104 to settle a plurality of transactions over a particular time period (e.g., one hour, twelve hours, one day, etc.). In some embodiments, transactions between the FI 102 and the partner FI 104 are netted and only the net amount outstanding at the conclusion of the settlement time period is transferred between the FI 102 and the partner FI 104.

The MBC account setup circuit 126 may be structured to establish an MBC account to be mapped (e.g., linked) to a customer fiat account within the customer fiat accounts database 138. In some embodiments, the MBC account setup circuit 126 automatically creates an MBC account for each customer fiat account. For example, when a customer 112 opens a new account at the FI 102, the MBC account setup circuit 126 will create an MBC account for that customer 112 to be used in connection with the transaction processing system 100. In other embodiments, the MBC account setup circuit 126 creates temporary MBC accounts that are used for only a single transaction.

The account mapping circuit 128 may be structured to map the created MBC account to the customer's fiat account at the FI 102, or vice versa. As shown in FIG. 2, the account mapping circuit 128 may be communicably and operatively coupled to the customer fiat accounts database 138 and the MBC accounts database 144. The account mapping circuit 128 updates the MBC account information when the customer transfers fiat currency from a customer fiat account. More specifically, the account mapping circuit 128 monitors all incoming and outgoing payments in the fiat currency account and updates the mapped MBC account based on that activity. For example, when a customer 112 transfers an amount of fiat currency (e.g. $100) to a customer at a partner FI, the account mapping circuit 128 will update (e.g., debit) the relative amount of MBC in the MBC accounts database 144. As noted above, in some embodiments, one unit of MBC (e.g., one MBC coin) is equivalent to one unit of fiat currency (e.g., one U.S. dollar). In other embodiments, one unit of MBC is equivalent to another amount of fiat currency. It should be understood that, according to various embodiments, MBC is used as a proxy for fiat currency, and does not have any intrinsic value. The process of monitoring fiat accounts and updating MBC accounts is described further herein with regard to FIG. 5.

The MBC accounts database 144 may be structured to selectively provide access to information relating to the created MBC accounts of the customer 112. In this regard, the MBC accounts database 144 may be communicably and operatively coupled to the FI computing system 106 to provide access to such information, such that the FI computing system 106 may facilitate transactions between the FI 102 and the partner FI 104 using MBC wallets (e.g., FI MBC wallet 162, partner MBC wallet 164) held with the permissioned blockchain system 160.

In another embodiment, the permissioned ledger banking system 124 may include a pooled MBC account, overlay ledger, and permissioned ledger to facilitate near real-time transfers between FIs. The pooled MBC account may be a database of addresses, private keys, and public keys associated with MBC that has been transferred to the FI 102. The FI 102 maintains the contents of the pooled MBC account in secrecy such that entities and people outside of the FI 102 do not have knowledge of the addresses, private keys, and public keys associated with the MBC transferred to the FI 102. Through the pooled MBC account, the FI computing system 106 updates (or syncs) customer fiat accounts with the pooled MBC account. When customer 112 performs deposit transactions with fiat currency into a fiat currency account, the FI computing system 106 mines (e.g., generates) MBC to sync the pooled MBC account with all customer fiat accounts. When a withdrawal transaction occurs, the amount of MBC in the pooled MBC account is deducted so as to reflect such a transaction. In this regard, MBC used in the system 100 does not contain value and is only used as a placeholder to perform real-time inter-bank fiat currency transfers.

In such an embodiment, the overlay ledger provides a record of association for the MBC within the pooled MBC account. The overlay ledger associates an individual customer with a designated amount of MBC transferred to the FI 102. The overlay ledger may be stored in a database. The FI 102 updates the overlay ledger after each MBC transfer into and out of the pooled MBC account.

Further in this embodiment, the permissioned ledger may be structured to monitor all incoming and outgoing currency in a customer fiat account to keep the overall balance of MBC in the pooled MBC account in sync with the customer fiat accounts. The permissioned ledger may be stored in a database. The permissioned ledger may "sync" the customer fiat accounts with the pooled MBC account.

In another embodiment, the permissioned ledger banking system 124 does not create (e.g., mine) or destroy (e.g., burn) any MBC. Instead, the FIs collectively maintain the same amount of MBC throughout the MBC transfer process. Similar to the operation of the settlement circuit 140, MBC may be transferred between the FI 102 and the partner FI 104 to settle a plurality of transactions over a particular time period (e.g., one hour, twelve hours, one day, etc.). In some embodiments, MBC transactions between the FI 102 and the partner FI 104 are netted and only the net amount outstanding at the conclusion of the settlement time period is transferred between the FI 102 and the partner FI 104.

Referring now to FIG. 3, a flow diagram of interactions between customers 112, a sending FI (e.g., FI 102), and a receiving FI (e.g., partner FI 104), including use of the permissioned ledger banking system 124 and the permissioned blockchain system 160 is shown, according to an example embodiment. As shown, all customer requests (e.g., transfer request 206) are received at an account management circuit 136 of the fiat banking system 122. The account management circuit 136 may communicate directly with customer devices (e.g., customer computing systems 116) via a network (e.g., network 110). The account management circuit 136 receives requests (e.g., transfer request 206), transaction information (e.g., amount of fiat currency to be transferred), fiat account information, and the like from customers 112. Based on the received information, the account management circuit 136 communicates with the customer fiat accounts database 138 to determine that a customer 112 has sufficient funds to complete the transaction (e.g., the transfer request 206). If sufficient funds are available to complete the transaction, the account management circuit 136 communicates the received information relating to the customer request to transaction circuit 142 of the permissioned ledger banking system 124.

The transaction circuit 142 communicates the transfer request to the account mapping circuit 128 to update the related MBC account in the MBC accounts database 144. The transaction circuit 142 may designate the amount of MBC relating to the amount of fiat currency to be transferred between the FIs during the transaction process. After determining the correct amount of MBC, the appropriate amount of MBC is transferred from the FI MBC wallet 162 to the partner MBC wallet 164 via the permissioned blockchain system 160.

The partner MBC wallet 164 receives the MBC and the permissioned blockchain system 160 transfers that amount of MBC from the partner MBC wallet 164 to the receiving FI (e.g., partner FI 104). The partner FI 104 receives the MBC by the partner permissioned ledger banking system 152. Similar to the FI 102, the partner FI 104 uses the permissioned ledger banking system 152 to designate an amount of fiat currency to credit the customer fiat account.

In this example, the partner permissioned ledger banking system 152 communicates with the partner fiat banking system 150 to credit the customer fiat account. When the partner fiat banking system 150 credits the customer fiat account, the receiving customer 212 will then receive the fiat currency (e.g., at step 214).

Figure 4:
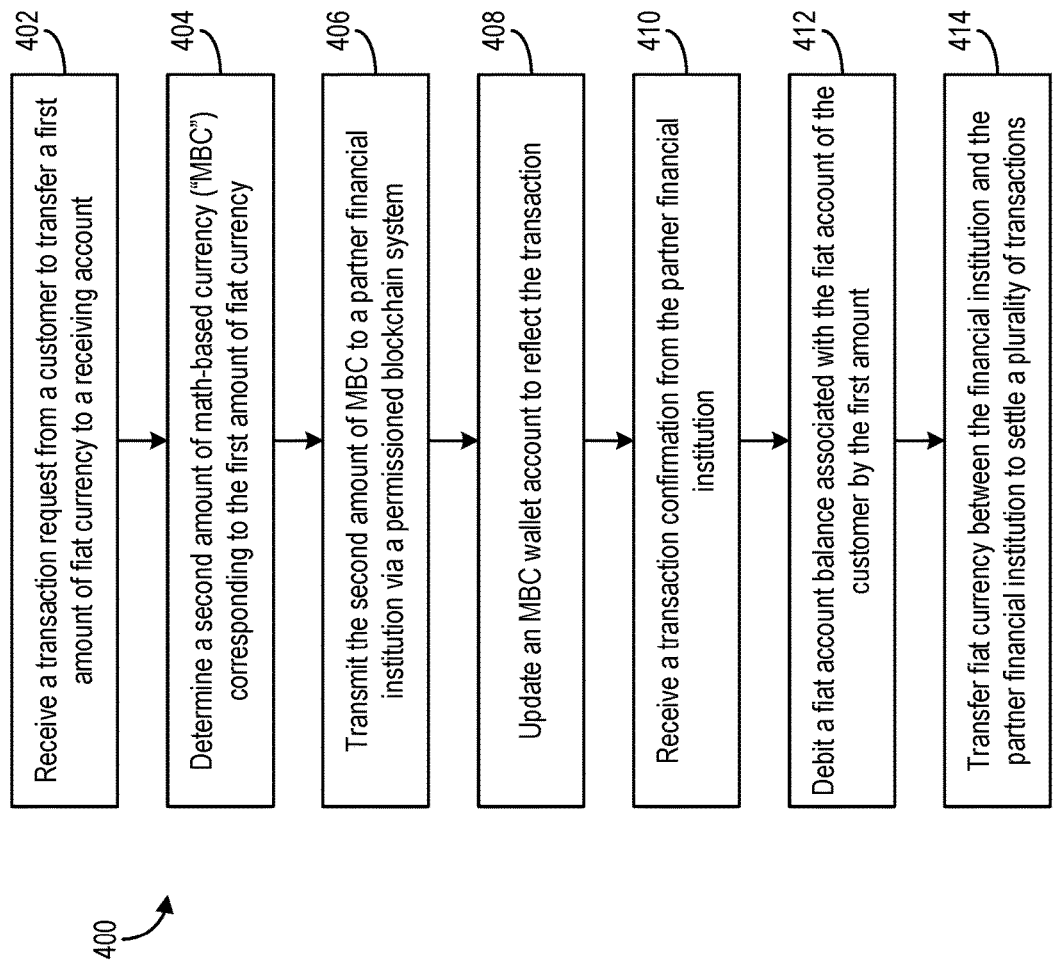
FIG. 4 is a flow diagram of a method for completing a transaction using the transaction processing system of FIG. 1, according to an example embodiment.

Referring now to FIG. 4, a method 400 of transferring fiat currency between FIs using a transaction processing system 100 is shown, according to an example embodiment. In describing method 400, references may be made to FIGS. 1-3.

At 402, a request to transfer a first amount of fiat currency is received. The transaction request may include information relating to any of an identity of the customer, an amount of fiat currency to be transferred, and a desired destination for the fiat currency (e.g., an account at a partner FI 104). In some arrangements, the request is transmitted from a user device (e.g., a personal computer, a smartphone, customer computing system 116, etc.) and received by the account management circuit 136 of the fiat banking system 122 of the FI 102. In other arrangements, the request is initiated by an employee of the FI 102 entering data into a computing system (e.g., an employee terminal connected to the server of the FI) during a person-to-person interaction. For example, the customer may walk into a branch location of the FI and initiate the deposit request via interaction with a teller at the branch.

At 404, upon receiving the request, a second amount of MBC corresponding to the first amount of fiat currency is determined. The MBC amount may be determined by the transaction circuit 142 of the permissioned ledger banking system 124. As discussed above, in some embodiments, one unit of MBC (e.g., one MBC coin) is equivalent to one unit of fiat currency (e.g., one U.S. dollar). In other embodiments, one unit of MBC is equivalent to another amount of fiat currency. In either arrangement, the MBC does not have value and serves as merely a placeholder for the fiat currency during the transaction process.

At 406, an amount of MBC is transmitted to a partner FI via a permissioned blockchain system. The transmission may be performed by the permissioned blockchain system 160, as shown in FIG. 3. The transaction circuit 142 within the permissioned ledger banking system 124 may transfer the amount of MBC to the FI MBC wallet 162 in the permissioned blockchain system 160, which then transmits the amount of MBC to the partner MBC wallet 164.

At 408, an MBC wallet account is updated to reflect the transaction. The FI MBC wallet 162 and the partner MBC wallet 164 are updated to reflect the debited or credited MBC. The FI MBC wallet 162 keeps track of the amount of MBC associated with the MBC accounts mapped to each customer fiat account with the FI 102.

At 410, a transaction confirmation from the partner FI is received. The transaction circuit 142 may receive the confirmation from the partner FI computing system 108 and communicate it to the fiat banking system 122. The transaction confirmation may serve as notification that the transaction has been completed with the partner FI 104.

At 412, the fiat account balance associated with the fiat account of the customer is debited by the first amount. The fiat account of the customer is mapped to the MBC account created for that customer fiat account by the account mapping circuit 128. In this regard, the account mapping circuit 128 is communicably and operatively coupled to the MBC accounts database 144 and the customer fiat accounts database 138 to establish the connections between the customer MBC account and the customer fiat account.

At 414, after a plurality of transactions are completed, fiat currency is transferred between the FI and the partner FI to settle those transactions. In this regard, it is important to note that MBC used in the system 100 does not contain value and is only used as a "messaging" system between FIs to perform near real-time fiat currency transfers. Process 414 may be performed by the settlement circuit 140. The settlement circuit 140 may be structured to transfer fiat currency between the FI 102 and the partner FI 104 to settle a plurality of transactions over a particular time period (e.g., one hour, twelve hours, one day, etc.). In some embodiments, transactions between the FI 102 and the partner FI 104 are netted and only the net amount outstanding at the conclusion of the settlement time period is transferred between the FI 102 and the partner FI 104.

Figure 5:
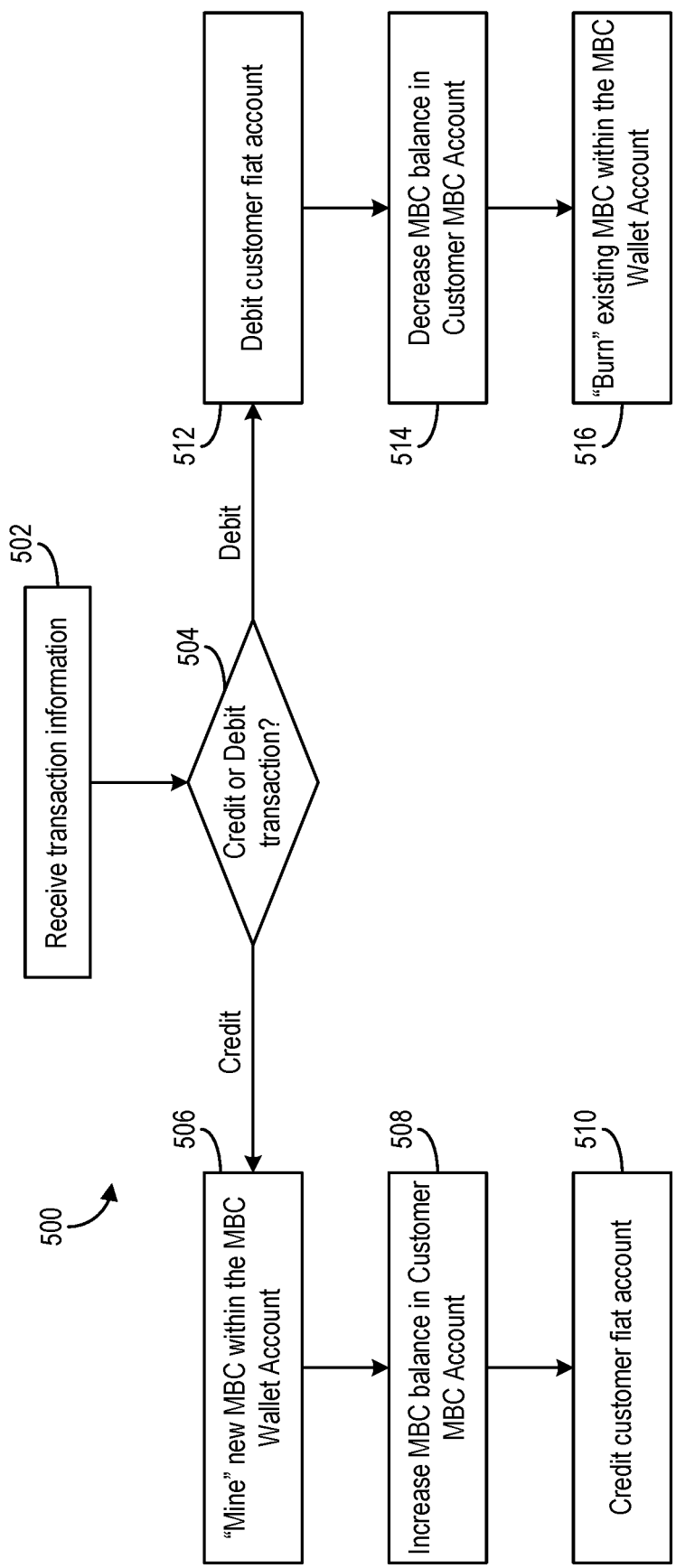
FIG. 5 is a flow diagram of syncing a fiat currency account with an MBC account, according to an example embodiment.

Referring now to FIG. 5, a flow diagram of a method 500 for syncing customer fiat accounts with the pooled MBC account is shown, according to an example embodiment.

At 502, transaction information is received. The transaction information may be received by the transaction circuit 142 of the permissioned ledger banking system 124. The customer 112 may request the transaction via the customer computing system 116.

At 504, a type of transaction is determined based on whether the transaction includes a debit or credit to the customer fiat account. The transaction information includes whether the type of transaction is a debit transaction or a credit transaction. As noted, this information is received by the transaction circuit 142, which then determines the type of transaction. Depending on the type of transaction, the process by which the customer fiat account is credited/debited may differ. Additionally, the transaction circuit 142 may designate the amount of MBC relating to the amount of fiat currency to be transferred between the FIs during the transaction process.

At 506, if the type of transaction is determined to be a credit transaction, new MBC is mined within the FI MBC wallet account 162. Process 506 may be performed by the account mapping circuit 128. This process may be conducted without the traditional proof-of-work requirement that is associated with MBC mining processes. This mining process occurs only for the benefit of facilitating a transaction process (e.g., transfer of currency between FIs). As mentioned above, it should be understood that MBC is used as a proxy for fiat currency, and does not have any intrinsic value.

At 508, after new MBC is mined, the MBC balance in the customer MBC account is increased. Process 508 may be performed by the account mapping circuit 128 of the permissioned ledger banking system 124. In this regard, the permissioned ledger banking system 124 may be communicably and operatively coupled to the permissioned blockchain system 160 such that any new MBC mined within the FI MBC wallet 162 is updated in the customer MBC account to reflect that account balance change.

At 510, the customer fiat account is credited. Process 510 may be performed by the account mapping circuit 128 to reflect the transaction information received from the transaction request. In this regard, the account mapping circuit 128 may be communicably and operatively coupled to the MBC accounts database 144 and to the customer fiat accounts database 138 to effectively sync the customer fiat accounts with the customer MBC accounts.

At 512, if the type of transaction is determined to be a debit transaction, at the next step, the customer fiat account is debited. Process 512 may be performed by the account management circuit 136 within the fiat banking system 122. As such, the fiat banking system 122 may be communicably and operatively coupled to the permissioned ledger banking system 124 such that a near real-time transfer between FIs may occur.

At 514, the MBC balance in the customer MBC account is decreased. Process 514 may be performed by the account mapping circuit 128 of the permissioned ledger banking system 124. In this regard, the account mapping circuit 128 may be communicably and operatively coupled to the MBC accounts database 144 and to the customer fiat accounts database 138 to effectively sync the customer fiat accounts with the customer MBC accounts.

At 516, once the MBC balance in the customer MBC account has been decreased, currently held MBC is burned (e.g., discarded) within the FI MBC wallet account 162. Process 516 may be performed by the account mapping circuit 128. In this regard, the permissioned ledger banking system 124 may be communicably and operatively coupled to the permissioned blockchain system 160 such that any decrease in the customer MBC account may be reflected in the FI MBC wallet account 162. This process occurs only for the benefit of facilitating a transaction process (e.g., transfer of currency between FIs). As mentioned above, it should be understood that MBC is used as a proxy for fiat currency, and does not have any intrinsic value.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system for performing a transaction for a customer of a financial institution using math-based currency (MBC) which does not have intrinsic value, the system comprising:
a permissioned ledger banking system comprising a transaction circuit comprising a transaction processor and a transaction memory, an account mapping circuit comprising an account mapping processor and an account mapping memory, and an MBC account database comprising an MBC account of the customer;
a fiat banking system comprising an account management circuit and a customer fiat accounts database, and the permissioned ledger banking system and the fiat banking system are connected via a communications network;
wherein the account management circuit comprises an account management processor and an account management memory storing executable account management instructions that when executed by the account management processor causes the account management processor to perform the steps of:
storing a fiat account of the customer in the customer fiat accounts database;
debiting the fiat account of the customer when the transaction processor determines that transaction information received by the transaction processor from a computing system of the customer is a debit transaction;
wherein the transaction memory stores executable transaction instructions that when executed by the transaction processor causes the transaction processor to perform the steps of:
receiving, via the communications network, the transaction information from the computing system of the customer, wherein the transaction information includes an amount of fiat currency; and
determining whether the transaction information is a credit transaction or the debit transaction of the fiat account of the customer; and
wherein the account mapping memory stores executable account mapping instructions that when executed by the account mapping processor causes the account mapping processor to perform the steps of:
mining, via the communications network, an amount of MBC corresponding to the amount of fiat currency within a wallet account on a permissioned blockchain system when the transaction processor determines that the transaction information is the credit transaction;
increasing an amount of MBC in the MBC account according to the mined amount of MBC;
crediting, via the communications network, the fiat account of the customer according to the amount of fiat currency when the transaction processor determines that the transaction information is the credit transaction,
decreasing the amount of MBC in the MBC account of the customer, corresponding to the amount of fiat currency, when the transaction processor determines that the transaction is the debit transaction and the account management processor debited the amount of fiat currency in the fiat account of the customer; and
burning, via the communications network, once the amount of MBC has been decreased from the MBC account of the customer, an MBC amount within the wallet account.

2. The system of claim 1, wherein the transaction information relates to a transaction between the financial institution and a partner financial institution, the partner financial institution being an authorized member of the permissioned blockchain system.

3. The system of claim 2, wherein the MBC account of the customer is for processing transactions between the customer of the financial institution and customers of the partner financial institution.

4. A system for performing a transaction for a customer of a financial institution using math-based currency (MBC) which does not have intrinsic value, the system comprising:
a permissioned ledger banking system comprising a transaction circuit comprising a transaction processor and a transaction memory, an account mapping circuit comprising an account mapping processor and an account mapping memory, a settlement circuit comprising a settlement processor and a settlement memory, and an MBC account database comprising an MBC account of the customer;
a fiat banking system comprising an account management circuit and a customer fiat accounts database, and the permissioned ledger banking system and the fiat banking system are connected via a communications network;
wherein the account management circuit comprises an account management processor and an account management memory storing executable account management instructions that, when executed by the account management processor, cause the account management processor to perform the steps of:
storing a fiat account of the customer in the customer fiat accounts database;
debiting the fiat account of the customer when the transaction processor determines that transaction information received by the transaction processor from a computing system of the customer is a debit transaction;
wherein the transaction memory stores executable transaction instructions that when executed by the transaction processor causes the transaction processor to perform the steps of:
receiving, via the communications network, the transaction information from the computing system of the customer, wherein the transaction information includes an amount of fiat currency; and
determining whether the transaction information is a credit transaction or the debit transaction of the fiat account of the customer, and
wherein the account mapping memory stores executable account mapping instructions that when executed by the account mapping processor causes the account mapping processor to perform the steps of:
mining, via the communications network, an amount of MBC corresponding to the amount of fiat currency within a wallet account on a permissioned blockchain system when the transaction processor determines that the transaction information is the credit transaction;
increasing an amount of MBC in the MBC account according to the mined amount of MBC;
crediting, via the communications network, the fiat account of the customer according to the amount of fiat currency when the transaction processor determines that the transaction information is the credit transaction, decreasing the amount of MBC in the MBC account of the customer, corresponding to the amount of fiat currency, when the transaction processor determines that the transaction is the debit transaction and the account management processor debited the amount of fiat currency in the fiat account of the customer; and burning, via the communications network, once the amount of MBC has been decreased from the MBC account of the customer, an MBC amount within the wallet account, and wherein the settlement memory stores executable settlement instructions that, when executed by the settlement processor, cause the settlement processor to perform the step of settling a plurality of transactions by transferring fiat currency between the financial institution and a partner financial institution.

5. The system of claim 4, wherein the partner financial institution is an authorized member of the permissioned blockchain system.

6. The system of claim 4, wherein the MBC account is only used for processing transactions between the customer of the financial institution and customers of the partner financial institution.

7. The system of claim 4, wherein the account mapping circuit instructions, when executed by the account mapping processor, further cause the account mapping processor to perform the steps of:

receiving an indication of a transaction request associated with the transaction information;

determining that the MBC account does not exist; and creating the MBC account for processing the transaction request based on the determination that the MBC account does not exist.

* * * * *